United States Patent [19]

Tanaka

[11] Patent Number: 5,663,235
[45] Date of Patent: Sep. 2, 1997

[54] GOLF BALL

[75] Inventor: Hiroaki Tanaka, Kobe, Japan

[73] Assignee: Sumitomo Rubber Industries, Ltd., Hyogo-ken, Japan

[21] Appl. No.: 654,582

[22] Filed: May 29, 1996

[30]  Foreign Application Priority Data

May 31, 1995 [JP] Japan .................................. 7-158516

[51] Int. Cl.$^6$ .............................. A63B 37/12; C08L 33/02; C08L 23/08; C08L 25/08
[52] U.S. Cl. ......................... 525/201; 525/196; 525/221; 473/372; 473/377; 473/385
[58] Field of Search .................................. 473/372, 385, 473/377; 525/196, 201, 207, 221

[56] References Cited

U.S. PATENT DOCUMENTS

| | | | |
|---|---|---|---|
| 3,437,718 | 4/1969 | Rees | 525/221 |
| 5,098,105 | 3/1992 | Sullivan | 473/372 |
| 5,397,840 | 3/1995 | Sullivan | 525/221 |

*Primary Examiner*—David Buttner
*Attorney, Agent, or Firm*—Birch, Stewart, Kolasch & Birch, LLP

[57] ABSTRACT

Disclosed is a golf ball having excellent shot feel, control properties as well as satisfactory flight performance and cut resistance. The golf ball has a core and a cover covering the core wherein the cover has a stiffness modulus of 100 to 250 MPa and comprises a base resin and an additive, and the base resin mainly contains a mixture of specific resins (A) and (B) in a weight ratio of 60:40 to 90:10

(A) is an ionomer resin (B) is a styrene/carboxylic and copolymer.

4 Claims, 2 Drawing Sheets

GOLF BALL

FIELD OF THE INVENTION

The present invention relates to a golf ball. More particularly, it relates to a golf ball having excellent shot feel and control properties as well as satisfactory flight performance and cut resistance.

BACKGROUND OF THE INVENTION

Recently, an ionomer resin has widely been used as a base resin for an cover of golf balls (e.g. Japanese Patent Publication No. 49-27093). Particularly, the ionomer resin is exclusively used in a two-piece golf ball which is composed of a solid core and a cover covering the solid core. This is because the ionomer resin is good in durability, cut resistance and rebound characteristics and, as well as good processability However, the ionomer resin is poor in shot feel and control properties (ease of putting spin on the ball) in comparison with a balata (trans-polyisoprene) used as the base resin for the cover of the thread wound golf ball, since the ionomer resin is hard and has high stiffness modulus. Therefore, there has been made intensive study of improving the shot feel and controllability by softening the ionomer resin using various means.

For example, Japanese Laid-Open Patent Publication Nos. 1-308577 and 5-3913 suggest to soften the ionomer resin by blending or mixing it with a special soft ionomer resin obtained by neutralizing a terpolymer of an $\alpha$-olefin, an unsaturated carboxylic acid (e.g. acrylic acid, methacrylic acid, etc.) and an acrylate with a sodium or zinc ion.

However, even if the soft ionomer resin as described above is blended, golf balls having shot feel similar to the golf ball having the balata cover have not been obtained. Adversely it raises a problem that the rebound characteristics and flight performance are deteriorated thereby.

Japanese Laid-Open Patent Publication No. 6-192512 suggests use of a mixture of an ionomer resin and a thermoplastic polyamide elastomer, which improves rebound characteristics while maintaining softness. Although the improving effect can also be admitted in view of the maintenance of softness according to this method, rebound characteristic and shot feel are not improved to sufficient range because the softening is conducted by increasing a mixing ratio of the thermoplastic polyamide elastomer.

OBJECTS OF THE INVENTION

Under these circumstances, the present inventors have intensively studied about the base resin of the cover, in order to satisfy excellent shot feel and control properties, which are similar to those of the golf ball having the balata cover, as well as flight performance and cut resistance due to the ionomer resin, simultaneously. As a result, it has been found that, by using a cover comprising a mixture of the following resin (A) and resin (B) in a weight ratio of 60:40 to 90:10, a stiffness modulus of the cover being 100 to 250 MPa, as a main component of the base resin of the cover:

resin (A): an ionomer resin selected from the group consisting of an ionomer resin (i) obtained by neutralizing at least a portion of carboxyl groups in a copolymer of ethylene and an $\alpha,\beta$-unsaturated carboxylic acid with a metal ion; a mixture of the ionomer resins (i); and a mixture of an ionomer resin (i) and an ionomer resin (ii) obtained by neutralizing at least a portion of carboxyl groups in a terpolymer of ethylene, an $\alpha,\beta$-unsaturated carboxylic acid and an $\alpha,\beta$-unsaturated carboxylate with a metal ion; and resin (B): at least one styrene-unsaturated carboxylic acid copolymer selected from the group consisting of a styrene-unsaturated dibasic carboxylic acid copolymer having a Shore D hardness of 20 to 40 and a stiffness modulus of 10 to 50 MPa; a styrene-unsaturated dibasic carboxylic acid half ester copolymer having a Shore D hardness of 20 to 40 and a stiffness modulus of 10 to 50 MPa; a styrene-unsaturated dibasic carboxylic acid diester copolymer having a Shore D hardness of 20 to 40 and a stiffness modulus of 10 to 50 MPa; a styrene-acrylic acid copolymer having a Shore D hardness of 20 to 40 and a stiffness modulus of 10 to 50 MPa; and a styrene-methacrylic acid copolymer having a Shore D hardness of 20 to 40 and a stiffness modulus of 10 to 50 MPa.

A main object of the present invention is to provide a golf ball having excellent shot feel and control properties as well as satisfactory flight performance and cut resistance.

This object as well as other objects and advantages of the present invention will become apparent to those skilled in the art from the following description with reference to the accompanying drawings.

SUMMARY OF THE INVENTION

Figure 1:
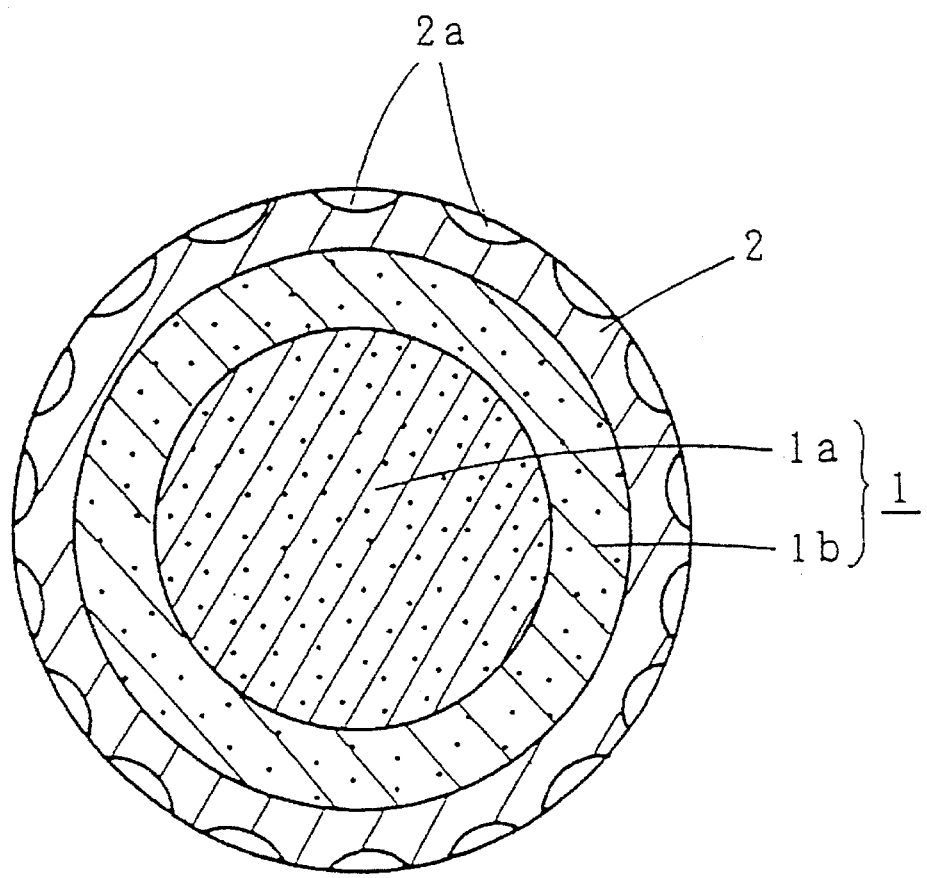
FIG. 1 is a schematic cross section illustrating one embodiment of the golf ball of the present invention.

The present invention provides a golf ball which comprises a core and a cover for covering the core, wherein the cover has a stiffness modulus of 100 to 250 MPa and comprises a base resin and an additive, and the base resin mainly contains a mixture of the following resin (A) and resin (B) in a weight ratio of 60:40 to 90:10;

resin (A): an ionomer resin selected from the group consisting of an ionomer resin (i) obtained by neutralizing at least a portion of carboxyl groups in a copolymer of ethylene and an $\alpha,\beta$-unsaturated carboxylic acid with a metal ion; a mixture of the ionomer resins (i); and a mixture of an ionomer resin (i) and an ionomer resin (ii) obtained by neutralizing at least a portion of carboxyl groups in a terpolymer of ethylene, an $\alpha,\beta$-unsaturated carboxylic acid and an $\alpha,\beta$-unsaturated carboxylate with a metal ion; and resin (B): at least one styrene-unsaturated carboxylic acid copolymer selected from the group consisting of a styrene-unsaturated dibasic carboxylic acid copolymer having a Shore D hardness of 20 to 40 and a stiffness modulus of 10 to 50 MPa; a styrene-unsaturated dibasic carboxylic acid half ester copolymer having a Shore D hardness of 20 to 40 and a stiffness modulus of 10 to 50 MPa; a styrene-unsaturated dibasic carboxylic acid diester copolymer having a Shore D hardness of 20 to 40 and a stiffness modulus of 10 to 50 MPa; a styrene-acrylic acid copolymer having a Shore D hardness of 20 to 40 and a stiffness modulus of 10 to 50 MPa; and a styrene-methacrylic acid copolymer having a Shore D hardness of 20 to 40 and a stiffness modulus of 10 to 50 MPa.

DETAILED DESCRIPTION OF THE INVENTION

In the present invention, it is considered that a carboxylic acid group or a carboxylate group of the resin (B) may enhance the compatibility between the resin (A) and resin (B) and may cause a modification of a microphase structure. Accordingly, it not only reduces the high stiffness of the ionomer resin of the resin (A) to give rise to good hit feel and controllability similar to the balata cover, but does not lower flight performance and cut resistance of the ionomer resin.

In the present invention, the ionomer resin (i) in the above resin (A) is obtained by neutralizing at least a portion of carboxyl groups in a copolymer of ethylene and an α,β-unsaturated carboxylic acid with a metal ion. The ionomer resin (ii) is obtained by neutralizing at least a portion of carboxyl groups in a terpolymer of ethylene, an α,β-unsaturated carboxylic acid and an α,β-unsaturated carboxylate with a metal ion.

The α,β-unsaturated carboxylic acid includes acrylic acid, methacrylic acid, fumaric acid, maleic acid, crotonic acid and the like. Among them, acrylic acid and methacrylic acid are particularly preferred. Further, examples of the unsaturated carboxylic acid ester are an alkyl ester of acrylic acid, methacrylic acid, fumaric acid, maleic acid and crotonic acid and the alkyl group includes methyl, ethyl, propyl, n-butyl, isobutyl and the like. Among them, acrylic ester and methacrylic ester are particularly preferred. Examples of the metal ion with which at least a portion of carboxyl groups in the copolymer of the ethylene and α,β-unsaturated carboxylic acid or terpolymer of the ethylene, α,β-unsaturated carboxylic acid and α,β-unsaturated carboxylate include sodium ion, lithium ion, zinc ion, magnesium ion, potassium ion, etc.

Examples of the above ionomer resin (i) and ionomer resin (ii) will be shown by the trade name. The ionomer resin (i) includes Hi-milan 1605, (Na), Hi-milan 1707 (Na), Hi-milan AM7318, (Na), Hi-milan 1706 (Na), Hi-milan AM7315 (Zn), Hi-milan AM7317 (Zn), Hi-milan AM7311 (Mg), Hi-milan MK7320 (K), etc., which are available from Mitsui Du Pont Polychemical Co., Ltd. The ionomer resin (ii) includes Hi-milan 1856 (Na), Hi-milan 1855 (Zn), Hi-milan AM7316 (Zn), etc., which are available from Mitsui Du Pont Polychemical Co., Ltd. Examples of the ionomer resin (i) commercially available from Du Pont U.S.A. are Surlyn 8920 (Na), Surlyn 8940 (Na), Surlyn AD8512 (Na), Surlyn 9910 (Zn), Surlyn AD8511 (Zn), Surlyn 7930 (Li), Surlyn 7940 (Li), etc.; and examples of the ionomer resins (ii) available from Du Pont U.S.A. are Surlyn AD8265 (Na), Surlyn AD8269 (Na), etc. From Exxon Chemical Co., the ionomer resin (i) is commercially available as Iotek 7010 (Zn), Iotek 8000 (Na), etc. The terms, Na, Zn, K, Li, Mg, etc., which are described in parentheses at the back of the trade name of the above ionomer resin show neutralization metal ion species, respectively. In the present invention, as the resin (A), a mixture of an ionomer resin neutralized with the above described monovalent metal ion and an ionomer resin neutralized with the divalent metal ion may be used, or a mixture of ionomer resins neutralized with the monovalent metal ion or ionomer resins neutralized with the monovalent metal ion may be used. As described above, the resin (B) is at least one styrene-unsaturated carboxylic acid copolymer having a Shore D hardness of 20 to 40 and a stiffness modulus of 10 to 50 MPa, which is selected from the group consisting of a styrene-unsaturated dibasic carboxylic acid copolymer, a styrene-unsaturated dibasic carboxylic acid half ester copolymer, a styrene-unsaturated dibasic carboxylic acid diester copolymer, a styrene-acrylic acid copolymer and a styrene-methacrylic acid copolymer. Examples of the unsaturated dibasic carboxylic acid in the resin (B) are maleic acid, itaconic acid, mesaconic acid, citraconic acid, fumaric acid, etc. Among them, maleic acid is particularly preferred. Examples of the ester thereof are esters of an alkyl group having 6 carbon atoms or less, such as methyl, ethyl, propyl, isopropyl and the like. Examples of the resins (B) are half ester copolymer, diester copolymer and acrylic acid copolymer which are commercially available from Nihon Shokubai Kagaku Co., Ltd. under the trade name of "Oxirac".

It is necessary that the styrene-unsaturated carboxylic acid copolymer as the resin (B) has a Shore D hardness of 20 to 40. The reason is as follows. When the Shore D hardness is smaller than 20 in the thermoplastic polyamide elastomer as the resin (B), the mixture with the ionomer resin as the resin (A) is too soft and the rebound characteristics are deteriorated, which results in deterioration of flight performance. On the other hand, when the Shore D hardness is smaller than 40, the ionomer resin as the resin (A) can not be softened sufficiently and good shot feel is not obtained.

It is necessary that the styrene-unsaturated carboxylic acid copolymer as the resin (B) has a stiffness modulus of 10 to 50 MPa. When the stiffness modulus of the styrene-unsaturated carboxylic acid copolymer as the resin (B) is lower than 10 MPa, the mixture of the ionomer resin as the resin (A) is too soft and the rebound characteristics are deteriorated, which results in deterioration of flight distance. On the other hand, when the stiffness modulus is higher than 50 MPa, the ionomer resin as the resin (A) can not be softened sufficiently, which results in inferior hit feel.

In the present invention, the mixing ratio of the ionomer resin as the resin (A) to the styrene-unsaturated carboxylic acid copolymer as the resins (B) is 60:40 to 90:10 (weight ratio), preferably 70:30 to 85:15 (weight ratio). When the proportion of the ionomer resin as the resin (A) is larger than the above range, the properties of the ionomer resin as the resin (A) appear strongly, which results in inferior shot feel. On the other hand, when the proportion of the ionomer resin as the resin (A) is smaller than the above range, the cover is too soft and the rebound characteristics are deteriorated, which results in deterioration of flight performance.

In the present invention, the base resin of the cover is composed of the ionomer resin as the resin (A) and styrene-unsaturated carboxylic acid copolymer as the resin (B). It is necessary that the cover containing the base resin has a stiffness modulus of 100 to 250 MPa. When the stiffness modulus of the resin (A) is lower than 100 MPa, the cover is too soft and the spin amount is too increased, which results in decrease of flight distance and deterioration of cut resistance. On the other hand, when the stiffness modulus is higher than 250 MPa, it is impossible to obtain a suitable back spin amount, which results in deterioration of control properties and shot feel. The above cover is exclusively occupied by the mixture of the ionomer resin as the resin (A) and styrene-unsaturated carboxylic acid copolymer as the resin (B). In may cases, a small amount of titanium dioxide, barium sulfate, etc. may be added and, therefore, the stiffness modulus is almost the same as that of the mixture of the ionomer resin as the resin (A) and styrene-unsaturated carboxylic acid copolymer as the resin (B).

In the present invention, the mixing ratio of the ionomer resin as the resin (A) to the styrene-unsaturated carboxylic acid copolymer as the resins (B) is 60:40 to 90:10 (weight ratio). It is preferred to appropriately select the ionomer resin as the resin (A) or appropriately use the ionomer resin (i) in combination with the ionomer resin (ii) so that the stiffness modulus of the resulting cover may be 100 to 250 MPa.

In the present invention, it is possible to obtain desired characteristics by mixing the ionomer resin as the resin (A)

with the styrene-unsaturated carboxylic acid copolymer as the resin (B). They are normally mixed with heating at 150° to 250° C. for 0.5 to 15 minutes, using internal mixers such as kneading type twin-screw extruder, Banbury, kneader, etc.

If necessary, various additives such as pigments, dispersants, antioxidants, UV absorbers, photostabilizers, etc. can be formulated in the cover composition used for forming a cover in the present invention, in addition to the mixture of an ionomer resin as the resin (A) and a styrene-unsaturated carboxylic acid copolymer as the resin (B). In addition, other resin can also be added unless characteristics of the mixture of the ionomer resin as the resin (A) and styrene-unsaturated carboxylic acid copolymer as the resin (B) are not deteriorated. When the other resin is added to form a base resin of the cover as described above, the proportion of the mixture of the ionomer resin as the resin (A) and styrene-unsaturated carboxylic acid copolymer as the resin (B) is preferably not less than 70% by weight, particularly not less than 80% by weight. In the present invention, "the mixture of the ionomer resin as the resin (A) and styrene-unsaturated carboxylic acid copolymer as the resin (B) is used as the main component of the base resin of the cover" means a case that the base resin of the cover is composed of the mixture of the ionomer resin as the resin (A) and styrene-unsaturated carboxylic acid copolymer as the resin (B) alone and a case that the other resin is added to the above mixture to form the base resin of the cover. In the present invention, the ionomer resin as the resin (A) may be previously mixed with the styrene-unsaturated carboxylic acid copolymer as the resin (B), followed by mixing with the other resin. In addition, the mixture may be mixed with the other additives when the cover composition is prepared.

Further, a golf ball can be obtained by covering the cover on a core. The core can be either a core for solid golf balls (solid core) and a core for thread wound golf balls (thread wound core).

The sold core may be not only a core of a two-piece golf balls, but also a core of multi-layer golf balls of two or more layers. For example, the core for a two-piece golf ball may be obtained by subjecting a rubber composition to a press vulcanization to compress with heating (e.g. at a temperature of 140° to 170° C. for 10 to 40 minutes) into a spherical vulcanized article. The rubber composition may be prepared by formulating 10 to 60 parts by weight of at least one vulcanizing agent (crosslinking agent) of α,β-ethylenically unsaturated carboxylic acids (e.g. acrylic acid, methacrylic acid, etc.) or metal salts thereof and functional monomers (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumyl peroxide, etc.) and 0.1 to 1 parts by weight of an antioxidant, based on 100 parts by weight of polybutadiene.

The thread wound core is composed of a center and a thread rubber layer wound on the center. The center may be a liquid center or a rubber center. The rubber center may be obtained by vulcanizing the same rubber composition as that of the solid core.

The thread rubber may be those which have hitherto been used. For example, it may be obtained by vulcanizing a rubber composition wherein an antioxidant, a vulcanizing accelerator and sulfur are formulated in a natural rubber or a combination of a natural rubber and synthetic polyisoprene. The core is not limited to the solid core and thread wound core.

A method of covering the cover on the core is not specifically limited, but may be a conventional method. For example, it can be a method comprising molding a cover composition prepared by formulating a suitable amount of a requisite additive in the above mixture of the ionomer resin as the resin (A) and styrene-unsaturated carboxylic acid copolymer as the resin (B) into a semi-spherical half-shell in advance, coveting a core with two half-shells and then subjecting to a pressure molding at 130° to 170° C. for 1 to 5 minutes, or a method comprising subjecting the cover composition to an injection molding to directly cover the core. A thickness of the cover is generally about 1 to 4 mm. In case of cover molding, a dimple may be formed on the surface of the ball, if necessary. Further, if necessary, a paint or marking may be provided after cover molding.

The structure of the golf ball of the present invention will be explained with reference to the accompanying drawing. FIG. 1 is a schematic cross section illustrating one embodiment of the golf ball of the present invention. The golf ball shown in FIG. 1 is a thread wound golf ball. In FIG. 1, 1 is a core comprising a center 1a and a thread rubber 1b, 2 is a cover and 2a is a dimple.

The center 1a and thread rubber 1b are not specifically limited, and those which are similar to a conventional one can be used. As the center 1a, a liquid or rubber center may be used. The thread rubber 1b is wound around the center 1a in a stretched state, thereby forming a core 1 referred to as a thread core. The cover 2 covers the core 1. This cover 2 is formed from the cover composition, which contains the ionomer resin as the resin (A) and styrene-unsaturated carboxylic acid copolymer as the resin (B).

Figure 2:
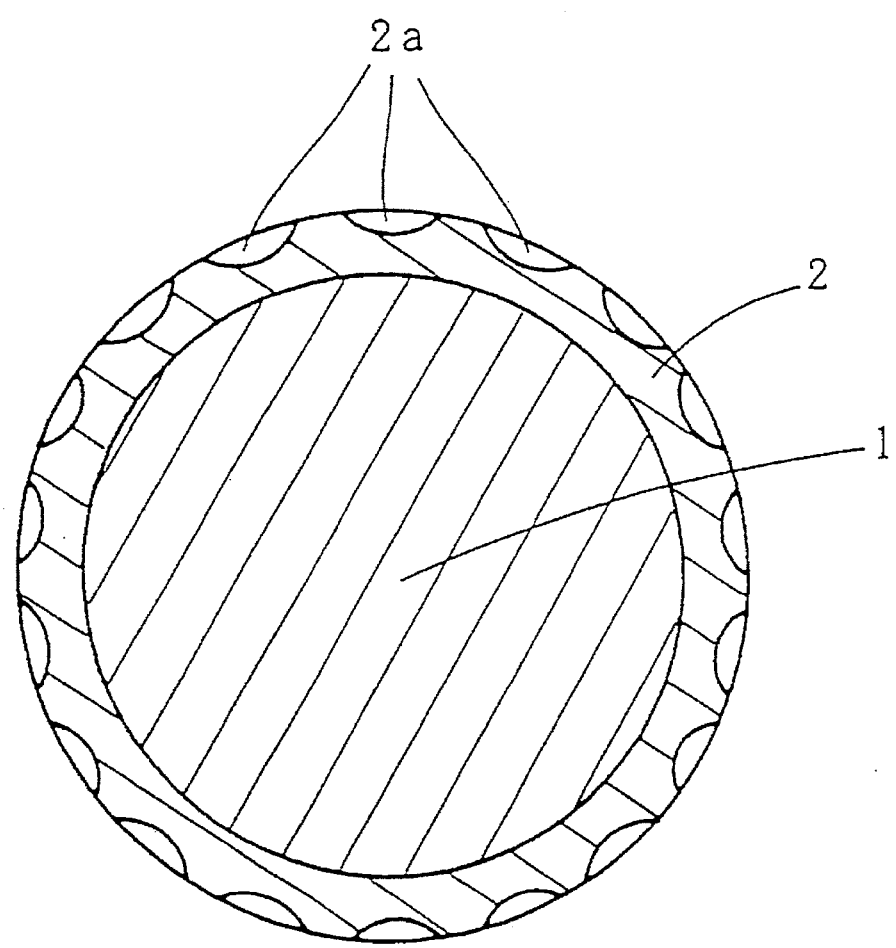
FIG. 2 is a schematic cross section illustrating another embodiment of the golf ball of the present invention.

FIG. 2 is a schematic cross section illustrating another embodiment of the golf ball of the present invention. The golf ball shown in FIG. 2 is a two-piece golf ball comprising a core 1 and a cover 2 covering the core. The core 1 is referred to as a solid core but is not specifically limited, for example, a vulcanized product of a rubber composition comprising polybutadiene as a main material as described above. The cover 2 for covering the core is a cover composition, which contains the above mixture of the ionomer resin as the resin (A) and styrene-unsaturated carboxylic acid copolymer as the resin (B). In addition, 2a is a dimple provided on the cover 2. In the golf ball shown in FIG. 2, the core 1 is composed of a vulcanized molded product of a single-layer rubber, but it may also be a two-layer solid core obtained by further forming an outer core of a vulcanized molded product of a rubber composition comprising polybutadiene as a main material around an inner core of a vulcanized molded product of a rubber composition comprising polybutadiene as a main material.

A suitable number/embodiment of dimples 2a are optionally provided on the cover 2 of the golf ball so that desired characteristics may be obtained. In addition, painting or marking is optionally provided on the surface of the golf ball.

As described above, according to the present invention, there is provided a golf ball having excellent shot feel, control properties, spin characteristics and durability as well as satisfactory flight performance and cut resistance.

EXAMPLES

The following Examples and Comparative Examples further illustrate the present invention in detail but are not to be construed to limit the scope thereof.

Examples 1 to 8 and Comparative Examples 1 to 8 (thread wound golf ball)

Thread wound golf balls of Examples 1 to 8 and Comparative Examples 1 to 8 were produced through the following processes ① to ③.

① Production of thread wound core:

A thread wound core having an outer diameter of 39.5 mm was produced by winding a thread rubber comprising a natural rubber/low-cis-isoprene rubber [Shell IR-309 (trade name), manufactured by Shell Chemistry Co.]=50:50 (weight ratio) as the base rubber on a liquid center having an outer diameter of 28.1 mm, said liquid center comprising a paste obtained by dispersing barium sulfate in water and a center bag of a vulcanized natural rubber having a thickness of 1.7 mm, which covers the paste.

② Production of cover composition:

The formulation components shown in Tables 1 to 4 were mixed using a kneading type twin-screw extruder to obtain a pelletized cover composition. Further, the composition of the compositions for cover of Preparation Examples 1 to 4 to be used for the golf balls of Examples 1 to 4 and the stiffness modulus of the cover are shown in Table 1. The cover compositions of Preparation Examples 5 to 8 to be used for the golf balls of Examples 5 to 8 and the stiffness modulus of the cover are shown in Table 2. The cover composition of Comparative Preparation Examples 1 to 4 to be used for the golf balls of Comparative Examples 1 to 4 and the stiffness modulus of the cover are shown in Table 3, respectively. The cover composition of Comparative Preparation Examples 5 to 8 to be used for the golf balls of Comparative Examples 5 to 8 and the stiffness modulus of the cover are shown in Table 4. In addition, the amount of each component to be formulated in the tables is represented by parts by weight, and it is also the same in the following tables. In the tables, the ionomer resin as the resin (A) and the styrene-unsaturated carboxylic acid copolymer as the resin (B) are represented by the trade name, and the details will be explained at the back of Table 4 in order. Regarding Comparative Preparation Example 8 to be used as the cover composition of the golf ball of Comparative Example 8, the formulation component is not shown in Table 4 and is shown at the back of Table 4 as ※17 because of its balata cover.

The extrusion conditions are as follows: a screw diameter: 45 mm; a screw revolution per minute: 200 rpm; a screw L/D: 35. The formulation components were heated at 220° to 260° C. at the die position of the extruder. In the present invention, the stiffness modulus and Shore D hardness are measured by the following measuring methods. As is apparent from the measuring methods, the stiffness modulus of the cover is measured as follows. That is, a sheet is produced from the cover composition and the resulting sheet is measured as a sample. This is because the cover of a golf ball immediately after production can not be measured. However, it is considered that the stiffness modulus of the cover of the golf ball immediately after production is substantially the same as that of the sample produced from the cover composition.

Stiffness modulus: It is measured according to ASTM D-747 after a sheet having a thickness of about 2 mm obtained by heat-press molding was preserved at 23° C. for two weeks.

Shore D hardness: It is measured according to ASTM D-2240 after a sheet having a thickness of about 2 mm obtained by heat-press molding was preserved at 23° C. for two weeks.

Among the cover compositions of Comparative Preparation Examples 1 to 8 to be used for the cover of the golf balls of Comparative Examples 1 to 8, typical one will be explained. The composition of Comparative Preparation Example 1 is a cover composition wherein only a high-rigid ionomer resin is used as the base resin, and the cover composition of Comparative Preparation Example 1 corresponds to a conventional standard composition for ionomer cover. In addition, the cover composition of Comparative Preparation Example 8 is a standard composition for balata cover. The golf ball of Comparative Example 1 wherein the cover composition of Comparative Preparation Example 1 is used and golf ball of Comparative Example 8 wherein the cover composition of Comparative Preparation Example 8 is used are golf balls for a criterion of comparison.

③ Production of golf ball:

A thread wound golf ball was obtained by molding a semi-spherical half-shell from the cover Composition of the above item ②, covering the core of the item ① with two half-shells and then subjecting to a press molding in a die for the golf ball at 150° C. for 6 minutes. The thread wound golf ball was coated with a paint to give a coated golf ball of 42.7 mm in outer diameter. Regarding the golf ball of Comparative Example 8, a thread wound golf ball was produced by pressing at 90° C. for 6 minutes and vulcanizing at 35° C. for 48 hours as shown in ※17.

The ball weight, the ball compression, the ball initial velocity and the flight distance (carry) of the golf ball thus obtained were measured. The ball compression was measured by PGA method, and the ball initial velocity was measured by R & A initial velocity measuring method. The flight distance was measured by hitting with a No. 1 wood club at a head speed of 45 m/second, using a swing robot manufactured by True Temper Co. Spin was measured by hitting with a No. 9 iron club at a head speed of 34 m/second, using a swing robot manufactured by True Temper Co., and then taking a photograph of the hit golf ball.

Also, in order to examine the cut resistance of the golf balls of the Examples 1 to 8 and Comparative Examples 1 to 8, the top part of the golf ball was hit at a head speed of 30 m/second using a swing robot mounted with a pitching wedge manufactured by True Temper Co. to examine whether a cut mark is arisen or not. The evaluation criteria are as follows.

Evaluation criteria:

○: No cut mark is formed.

Δ: Slight cut mark is formed.

X: Large cut mark is formed.

XX: Large cut mark which can not stand use is formed.

Further, in order to examine the durability of the above golf ball, a golf ball was hit with a No. 1 wood club at a head speed of 45 m/second using a swing robot manufactured by True Temper Co., and the number of times until breakage was arisen was measured. The resulting value was indicated as a durability index in case of the number of Example 1 being 100.

Further, the shot feel and the control properties of the resulting golf ball were evaluated by 10 top professional golfers according to a practical hitting test. The evaluation criteria are as follows. The results shown in the Tables below are based on the fact that not less than 8 out of 10 professional golfers evaluated with the same criterion about each test item.

Evaluation criteria:

○: Good, shot feel and control properties are similar to those of the golf ball with the balata cover.

Δ: Control properties are similar to those of the golf ball with the balata cover, but shot feel is quite different from that of the golf ball with the balata cover, that is, it is too heavy, which results in too strong impact, or it is too soft, which results in heavy feeling.

X: Both shot feel and control properties are inferior.

In Table 5, the ball weight, ball compression, ball initial velocity, flight distance, spin, cut resistance, durability, shot feel and control properties of the golf balls of Examples 1 to 4, and the kind of the cover composition used in the production of the golf ball are shown. Those of the gold balls of Examples 5 to 8, those of the golf balls of Comparative Examples 1 to 4 and those of the golf balls of Comparative Examples 5 to 8 are shown in Tables 6, 7 and 8, respectively.

TABLE 1

| | Preparation Example No. | | | |
|---|---|---|---|---|
| | 1 | 2 | 3 | 4 |
| Hi-milan 1605·X·1 | 25 | 22.5 | 0 | 0 |
| Hi-milan 1707·X·2 | 0 | 0 | 20 | 0 |
| Hi-milan AM7318·X·3 | 0 | 0 | 0 | 20 |
| Hi-milan 1856·X·4 | 0 | 0 | 0 | 40 |
| Hi-milan 1706·X·5 | 25 | 22.5 | 20 | 0 |
| Hi-milan AM7317·X·6 | 0 | 0 | 0 | 20 |
| Hi-milan 1855·X·7 | 35 | 40 | 40 | 0 |
| Oxirac SH-101·X·14 | 15 | 0 | 0 | 20 |
| Oxirac SH-1100·X·15 | 0 | 15 | 0 | 0 |
| Oxirac SH-2200·X·16 | 0 | 0 | 20 | 0 |
| Titanium dioxide | 2 | 2 | 2 | 2 |
| Barium sulfate | 2 | 2 | 2 | 2 |
| Stiffness modulus (MPa) | 190 | 160 | 120 | 220 |

TABLE 2

| | Preparation Example No. | | | |
|---|---|---|---|---|
| | 5 | 6 | 7 | 8 |
| Hi-milan 1706·X·5 | 25 | 0 | 30 | 0 |
| Hi-milan AM7317·X·6 | 0 | 0 | 0 | 30 |
| Hi-milan 1855·X·7 | 35 | 0 | 10 | 25 |
| Hi-milan MK7320·X·8 | 25 | 0 | 0 | 0 |
| Surlyn AD 8512·X·9 | 0 | 25 | 0 | 0 |
| Surlyn AD 8269·X·10 | 0 | 10 | 0 | 0 |
| Surlyn AD 8511·X·11 | 0 | 25 | 0 | 0 |
| Surlyn 7940·X·12 | 0 | 0 | 30 | 0 |
| Iotek 8000·X·13 | 0 | 0 | 0 | 30 |
| Oxirac SH-101·X·14 | 10 | 40 | 30 | 20 |
| Titanium dioxide | 2 | 2 | 2 | 2 |
| Barium sulfate | 2 | 2 | 2 | 2 |
| Stiffness modulus (MPa) | 160 | 100 | 210 | 240 |

TABLE 3

| | Comparative Preparation Example No. | | | |
|---|---|---|---|---|
| | 1 | 2 | 3 | 4 |
| Hi-milan 1605·X·1 | 50 | 30 | 0 | 0 |
| Hi-milan AM7318·X·3 | 0 | 0 | 25 | 0 |
| Hi-milan 1706·X·5 | 50 | 30 | 0 | 60 |
| Hi-milan AM7317·X·6 | 0 | 0 | 25 | 0 |
| Hi-milan 1855·X·7 | 0 | 0 | 0 | 40 |
| Surlyn AD 8269·X·10 | 0 | 40 | 50 | 0 |
| Titanium dioxide | 2 | 2 | 2 | 2 |
| Barium sulfate | 2 | 2 | 2 | 2 |
| Stiffness modulus (MPa) | 340 | 160 | 200 | 180 |

TABLE 4

| | Comparative Preparation Example No. | | | |
|---|---|---|---|---|
| | 5 | 6 | 7 | 8 |
| Hi-milan 1605·X·1 | 15 | 75 | 45 | Balata |
| Hi-milan 1706·X·5 | 15 | 25 | 50 | cover |
| Hi-milan 1855·X·7 | 70 | 0 | 0 | ·X·17 |

TABLE 4-continued

| | Comparative Preparation Example No. | | | |
|---|---|---|---|---|
| | 5 | 6 | 7 | 8 |
| Oxirac SH-101·X·14 | 0 | 0 | 5 | |
| Titanium dioxide | 2 | 2 | 2 | |
| Barium sulfate | 2 | 2 | 2 | |
| Stiffness modulus (MPa) | 150 | 90 | 300 | 300 |

·X·1: Hi-milan 1605 (trade name), ethylene-methacrylic acid copolymer ionomer resin obtained by neutralizing with a sodium ion, manufactured by Mitsui Du Pont Polychemical Co., MI (melt index): 2.8, stiffness modulus: 310 MPa, Shore D hardness: 62.

·X·2: Hi-milan 1707 (trade name), ethylene-methacrylic acid copolymer ionomer resin obtained by neutralizing with a sodium ion, manufactured by Mitsui Du Pont Polychemical Co., MI: 0.9, stiffness modulus: 320 MPa, Shore D hardness: 63.

·X·3: Hi-milan AM7318 (trade name), ethylene-methacrylic acid copolymer ionomer resi obtained by neutralizing with a sodium ion, manufactured by Mitsui Du Pont Polychemical Co., MI: 2.1, stiffness modulus: 345 MPa, Shore D hardness: 65.

·X·4: Hi-milan 1856 (trade name), ethylene-butyl acrylate-methacrylic acid terpolymer ionomer resin obtained by neutralizing with a sodium ion, manufactured by Mitsui Du Pont Polychemical Co., MI: 1.0, stiffness modulus: 85 MPa, Shore D hardness: 53.

·X·5: Hi-milan 1706 (trade name), ethylene-methacrylic acid copolymer ionomer resin obtained by neutralizing with a zinc ion, manufactured by Mitsui Du Pont Polychemical Co., MI: 0.8, stiffness modulus: 260 MPa, Shore D hardness: 61.

·X·6: Hi-milan AM7317 (trade name), ethylene-methacrylic acid copolymer ionomer resin obtained by neutralizing with a zinc ion, manufactured by Mitsuii Du Pont Polychemical Co., MI: 1.2, stiffness modulus: 310 MPa, Shore D hardness: 64.

·X·7: Hi-milan 1855 (trade name), ethylene-butyl acrylate-methacrylic acid terpolymer ionomer resin obtained by neutralizing with a zinc ion, manufactured by Mitsui Du Pont Polychemical Co., MI: 1.0, stiffness modulus: 90 MPa, Shore D hardness: 55.

·X·8: Hi-milan MK7320 (trade name), ethylene-methacrylic acid copolymer ionomer resin obtained by neutralizing with a potassium ion, manufactured by Mitsui Du Pont Polychemical Co., MI: 2.8, stiffness modulus: 290 MPa, Shore D hardness: 61.

·X·9: Surlyn AD8512 (trade name), ethylene-methacrylic acid copolymer ionomer resin obtained by neutralizing with a sodium ion, manufactured by Du Pont Co., MI: 4.4, stiffness modulus: 280 MPa, Shore D hardness: 62.

·X·10: Surlyn AD8269 (trade name), ethylene-butyl acrylate-methacrylic acid terpolymer resin obtained by neutralizing with a zinc ion, manufactured by Du Pont Co., MI: 1.0, stiffness modulus: 26 MPa, Shore D hardness: 36.

·X·11: Surlyn AD8511 (trade name), ethylene-methacrylic acid copolymer ionomer resin obtained by neutralizing with a zinc ion, manufactured by Du Pont Co., MI: 3.4, stiffness modulus: 220 MPa, Shore D hardness: 60.

·X·12: Surlyn 7940 (trade name), ethylene-methacrylic acid copolymer ionomer resin obtained by neutralizing with a lithium ion, manufactured by Du Pont Co., MI: 2.8, stiffness modulus: 350 MPa, Shore D hardness: 63.

·X·13: Iotek 8000 (trade name), ethylene-acrylic acid copolymer ionomer resin obtained by neutralizing with a sodium ion, manufactured by Exxon Chemical Co., MI: 0.8, stiffness modulus: 370 MPa, Shore D hardness: 64.

·X·14: Oxirac SH-101 (trade name), styrene-isopropyl maleate half ester copolymer, manufactured by Nihon Shokubai Kagaku Kogyo Co. Ltd., MI: 6, stiffness modulus: 26 MPa, Shore D hardness: 35.

·X·15: Oxirac SH-1100 (trade name), styrene-unsaturated dibasic carboxylic acid diester copolymer, manufactured by Nihon Shokubai Kagaku Kogyo Co. Ltd., MI: 5, stiffness modulus: 26 MPa, Shore D hardness: 25.

·X·16: Oxirac SH-2200 (trade name), styrene-acrylic acid copolymer, manufactured by Nihon Shokubai Kagaku Kogyo Co. Ltd., MI: 6, stiffness modulus: 31 MPa, Shore D hardness: 25.

·X·17: Balata cover, Normal composition for balata cover, prepared by mixing 10 parts by weight of a high-styrene resin, 10 parts by weight of titanium dioxide, 5 parts by weight of zinc oxide, 2 parts by weight of sulfur and 2 parts by weight of a vulcanization accelerator with 100 parts by weight of balata (transpolyisoprene) using a roll and extruding into a sheet form by calendering, and after molding into a cover, vulcanizing at about 35° C. for 48 hours.

TABLE 5

| | Example No. | | | |
|---|---|---|---|---|
| | 1 | 2 | 3 | 4 |
| Cover composition (Preparation Example No.) | 1 | 2 | 3 | 4 |
| Ball weight (g) | 45.4 | 45.4 | 45.3 | 45.3 |
| Ball compression (PGA) | 88 | 88 | 83 | 89 |
| Ball initial velocity (feet/second) | 252.5 | 252.5 | 252.4 | 253.4 |
| Flight distance (yard) | 228 | 229 | 228 | 229 |
| Spin (rpm) | 8500 | 8500 | 8400 | 8500 |
| Cut resistance | ○ | ○ | ○ | ○ |
| Durability (index) | 100 | 100 | 100 | 100 |
| Shot feel and control properties | ○ | ○ | ○ | ○ |

TABLE 6

| | Example No. | | | |
|---|---|---|---|---|
| | 5 | 6 | 7 | 8 |
| Cover composition (Preparation Example No.) | 5 | 6 | 7 | 8 |
| Ball weight (g) | 45.3 | 45.4 | 45.4 | 45.3 |
| Ball compression (PGA) | 87 | 81 | 86 | 89 |
| Ball initial velocity (feet/second) | 253.0 | 252.0 | 252.9 | 253.3 |
| Flight distance (yard) | 228 | 228 | 227 | 228 |
| Spin (rpm) | 8600 | 8400 | 8200 | 8500 |
| Cut resistance | ○ | ○ | ○ | ○ |
| Durability (index) | 99 | 150 | 98 | 96 |
| Shot feel and control properties | ○ | ○ | ○ | ○ |

TABLE 7

| | Comparative Example No. | | | |
|---|---|---|---|---|
| | 1 | 2 | 3 | 4 |
| Cover composition (Comparative Preparation Example No.) | 1 | 2 | 3 | 4 |
| Ball weight (g) | 45.3 | 45.3 | 45.4 | 45.3 |
| Ball compression (PGA) | 92 | 87 | 88 | 88 |
| Ball initial velocity (feet/second) | 253.0 | 251.0 | 251.2 | 251.1 |
| Flight distance (yard) | 230 | 222 | 223 | 222 |
| Spin (rpm) | 7000 | 7900 | 7700 | 7800 |
| Cut resistance | ○ | ○ | ○ | ○ |
| Durability (index) | 60 | 97 | 90 | 85 |
| Shot feel and control properties | × | ○ | △ | △ |

TABLE 8

| | Comparative Example No. | | | |
|---|---|---|---|---|
| | 5 | 6 | 7 | 8 |
| Cover composition (Comparative Preparation Example No.) | 5 | 6 | 7 | 8 |
| Ball weight (g) | 45.4 | 45.4 | 45.3 | 45.3 |
| Ball compression (PGA) | 85 | 91 | 86 | 87 |
| Ball initial velocity (feet/second) | 250.2 | 251.6 | 249.9 | 251.0 |
| Flight distance (yard) | 221 | 228 | 219 | 223 |
| Spin (rpm) | 8000 | 7000 | 8900 | 8500 |
| Cut resistance | △ | △ | ○ | ×× |
| Durability (index) | 80 | 60 | 85 | 40 |
| Shot feel and control properties | △ | × | ○ | ○ |

As is apparent from a comparison between the characteristics of the golf balls of Examples 1 to 8 shown in Tables 5 to 6 and those of the golf balls of Comparative Examples 1 to 8 shown in Tables 7 to 8, all golf balls of Examples 1 to 8 had excellent shot feel, control properties and spin characteristics, which are similar to those of the golf balls with the balata cover of Comparative Example 8. And besides, they attained the flight distance of 227 to 229 yards, which is almost the same as that of the golf ball as the thread wound golf ball with a standard ionomer cover of Comparative Example 1. The cut resistance is also the same as that of the golf ball of Comparative Example 1 and it reached a satisfactory level. In addition, the golf balls of Examples 1 to 8 were considerably superior in durability in comparison with the golf ball of Comparative Example 1.

To the contrary, the golf ball of Comparative Example 1 as the thread wound golf ball with a standard ionomer cover using only a high-rigid ionomer resin as the cover resin of the cover showed a hard shot feel and was inferior in control properties.

In addition, the golf ball of Comparative Example 2 using the mixture of the high-rigid ionomer resin and terpolymer soft ionomer resin as the base resin of the cover was superior in shot feel, control properties and spin characteristics, however, the flight distance was small. Regarding the golf balls of Comparative Examples 3 to 5 using the mixture of the high-rigid ionomer resin and terpolymer soft ionomer resin as the base resin of the cover, the spin characteristics and control properties were similar to those of the golf ball with the balata cover but the shot feel was not satisfactory. And besides, the flight distance was 221 to 223 and was considerably inferior in comparison with that of the golf balls of Examples 1 to 8.

In addition, the golf ball of Comparative Example 6 using only the mixture of the high-rigid ionomer resin as the base resin of the cover (the mixing proportion is different with that of Comparative Example 1) was also inferior in shot feel and control properties. In addition, the golf ball of Comparative Example 7 wherein the proportion of the styrene-unsaturated carboxylic acid copolymer as the component (B) is small showed a small initial velocity and a large spin amount in comparison with the golf balls of Examples 1 to 8 and, therefore, the flight distance was small. In addition, the golf ball of Comparative Example 8 as the thread wound golf ball with a standard balata cover was superior in shot feel, control properties and spin characteristics. However, the flight distance was 223 yards, which was considerably inferior in comparison with the golf balls of Examples 1 to 8. Particularly, the cut resistance and durability were considerably inferior.

Examples 9 to 16 and Comparative Examples 8 to 15 (two-piece solid golf ball)

① Production of core

A rubber composition prepared by formulating 36 parts by weight of zinc acrylate, 20 parts by weight of zinc oxide, 1.2 parts by weight of dicumyl peroxide and 0.5 parts by weight of an antioxidant [Yoshinox 425 (trade name), manufactured by Yoshitomi Seiyaku Co., Ltd.] in 100 parts by weight of a polybutadiene rubber [BR-11 (trade name), manufactured by Nihon Synthetic Rubber Co., Ltd] was subjected to a vulcanization molding at 160° C. for 25 minutes to give a solid core. The average diameter of the solid core thus obtained was 38.2 mm.

② Preparation of cover composition

The pelletized cover compositions prepared in Preparation Examples 1 to 8 and Comparative Preparation Examples 1 to 7 were used.

③ Production of golf ball

The cover composition obtained in the above item ② was covered on the solid core obtained in the above item ① by an injection molding to give a covered golf ball of 42.7 mm in diameter.

The ball weight, ball compression, ball initial velocity, flight distance, cut resistance and durability of the golf ball thus obtained were measured and the shot feel and the control properties were examined.

In Table 9, the ball weight, ball compression, ball initial velocity, flight distance, spin performances, cut resistance, durability, shot feel and control properties of the golf balls of Examples 9 to 12, and the kind of the cover composition used in the production of the golf ball are shown. Those of the golf balls of Examples 13 to 16, those of Comparative Examples 9 to 12 and those of the golf balls of Comparative Examples 13 to 15 are shown in Table 10, Table 11 and Table 12, respectively. The kind of the cover composition is shown by Preparation Example No. or Comparative Preparation Example No.

TABLE 9

|  | Example No. | | | |
| --- | --- | --- | --- | --- |
|  | 9 | 10 | 11 | 12 |
| Cover composition (Preparation Example No.) | 1 | 2 | 3 | 4 |
| Ball weight (g) | 45.4 | 45.4 | 45.3 | 45.3 |
| Ball compression (PGA) | 92 | 92 | 87 | 93 |
| Ball initial velocity (feet/second) | 252.9 | 252.5 | 253.0 | 253.7 |
| Flight distance (yard) | 232 | 232 | 232 | 232 |
| Spin (rpm) | 8300 | 8300 | 8400 | 8100 |
| Cut resistance | ○ | ○ | ○ | ○ |
| Durability (index) | 100 | 100 | 110 | 95 |
| Shot feel and control properties | ○ | ○ | ○ | ○ |

TABLE 10

|  | Example No. | | | |
| --- | --- | --- | --- | --- |
|  | 13 | 14 | 15 | 16 |
| Cover composition (Preparation Example No.) | 5 | 6 | 7 | 8 |
| Ball weight (g) | 45.3 | 45.4 | 45.4 | 45.3 |
| Ball compression (PGA) | 91 | 85 | 92 | 93 |
| Ball initial velocity (feet/second) | 253.3 | 252.8 | 253.7 | 253.6 |
| Flight distance (yard) | 233 | 232 | 233 | 232 |
| Spin (rpm) | 8000 | 8200 | 8200 | 8300 |
| Cut resistance | ○ | ○ | ○ | ○ |
| Durability (index) | 100 | 115 | 95 | 100 |
| Shot feel and control properties | ○ | ○ | ○ | ○ |

TABLE 11

|  | Comparative Example No. | | | |
| --- | --- | --- | --- | --- |
|  | 9 | 10 | 11 | 12 |
| Cover composition (Comparative Preparation Example No.) | 1 | 2 | 3 | 4 |
| Ball weight (g) | 45.3 | 45.3 | 45.4 | 45.3 |
| Ball compression (PGA) | 94 | 91 | 92 | 92 |
| Ball initial velocity (feet/second) | 253.3 | 251.3 | 251.5 | 251.5 |
| Flight distance (yard) | 233 | 225 | 226 | 226 |
| Spin (rpm) | 6800 | 7700 | 7500 | 7450 |
| Cut resistance | ○ | ○ | ○ | ○ |
| Durability (index) | 60 | 87 | 90 | 85 |
| Shot feel and control properties | × | △ | △ | △ |

TABLE 12

|  | Comparative Example No. | | |
| --- | --- | --- | --- |
|  | 13 | 14 | 15 |
| Cover composition (Comparative Preparation Example No.) | 5 | 7 | 8 |
| Ball weight (g) | 45.4 | 45.3 | 45.4 |
| Ball compression (PGA) | 89 | 88 | 94 |
| Ball initial velocity (feet/second) | 250.7 | 249.1 | 253.1 |
| Flight distance (yard) | 225 | 223 | 232 |
| Spin (rpm) | 7850 | 8600 | 7000 |
| Cut resistance | ○ | △ | ○ |
| Durability (index) | 90 | 80 | 65 |
| Shot feel and control properties | △ | △ | × |

As is apparent from a comparison between the characteristics of the golf balls of Examples 9 to 16 shown in Tables 9 to 10 and those of the golf balls of Comparative Examples 9 to 15 shown in Tables 11 to 12, the two-piece solid golf balls of the Examples 9 to 16 of the present invention had excellent shot feel, control properties and spin characteristics, which are similar to those of the thread wound golf balls of the Examples 1 to 8. And besides, they attained the flight distance of 231 to 233 yards, which is almost the same as that of the two-piece golf ball with a standard ionomer cover of Comparative Example 9, and reached a satisfactory level in cut resistance. In addition, the golf balls of Example 9 to 16 were considerably superior in durability in comparison with the golf ball of Comparative Example 9.

To the contrary, the golf ball of Comparative Example 9 as the two-piece solid golf ball with a standard ionomer cover using only a high-rigid ionomer resin as the base resin of the cover was superior in flying performance and cut resistance, but the shot feel, the control properties and durability were inferior. The golf balls of the Comparative Examples 10 to 15 were inferior in shot feel, control properties and durability, and among these, Comparative Examples 10 to 14 were also inferior in the flight distance in comparison with the golf balls of the Examples 9 to 16.

What is claimed is:

1. A golf ball comprising a core and a cover for covering the core, wherein said cover has a stiffness modulus of 100 to 250 MPa and comprises a base resin and an additive, and said base resin mainly contains a mixture of the following resin (A) and resin (B) in a weight ratio of 60:40 to 90:10;

resin (A): an ionomer resin selected from the group consisting of an ionomer resin (i) obtained by neutralizing at least a portion of carboxyl groups in a copolymer of ethylene and an $\alpha,\beta$-unsaturated carboxylic acid with a metal ion; a mixture of the ionomer resins (i); and a mixture of an ionomer resin (i) and an ionomer resin (ii) obtained by neutralizing at least a portion of carboxyl groups in a terpolymer of ethylene, an $\alpha,\beta$-unsaturated carboxylic acid and an $\alpha,\beta$-unsaturated carboxylate with a metal ion; and resin (B): at least one styrene-unsaturated carboxylic acid copolymer selected from the group consisting of a styrene-unsaturated dibasic carboxylic acid copolymer having a Shore D hardness of 20 to 40 and a stiffness modulus of 10 to 50 MPa; a styrene-unsaturated dibasic carboxylic acid half ester copolymer having a Shore D hardness of 20 to 40 and a stiffness modulus of 10 to 50 MPa; a styrene-unsaturated dibasic carboxylic acid diester copolymer having a Shore D hardness of 20 to 40 and a stiffness modulus of 10 to 50 MPa; a styrene-acrylic acid copolymer having a Shore D hardness of 20 to 40 and a stiffness modulus of 10 to 50 MPa; and a styrene-methacrylic acid copolymer having a Shore D hardness of 20 to 40 and a stiffness modulus of 10 to 50 MPa.

2. The golf ball according to claim 1, wherein the resin (A) is a mixture of an ionomer resin neutralized with a monovalent metal ion and an ionomer resin neutralized with a divalent metal ion.

3. The golf ball according to claim 1, wherein the dibasic carboxylic acid of the resin (B) is maleic acid.

4. The golf ball according to claim 2, wherein the dibasic carboxylic acid of the resin (B) is maleic acid.

* * * * *